United States Patent
Chen et al.

(10) Patent No.: US 11,417,090 B2
(45) Date of Patent: Aug. 16, 2022

(54) BACKGROUND SUPPRESSION FOR ANOMALY DETECTION

(71) Applicant: NEC Laboratories America, Inc., Princeton, NJ (US)

(72) Inventors: Yuncong Chen, Plainsboro, NJ (US); Dongjin Song, Princeton, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 309 days.

(21) Appl. No.: 16/790,242

(22) Filed: Feb. 13, 2020

(65) Prior Publication Data

US 2020/0265227 A1 Aug. 20, 2020

Related U.S. Application Data

(60) Provisional application No. 62/807,002, filed on Feb. 18, 2019.

(51) Int. Cl.
| | |
|---|---|
| G06V 20/00 | (2022.01) |
| G06V 20/10 | (2022.01) |
| G06V 10/22 | (2022.01) |
| G06V 10/143 | (2022.01) |

(52) U.S. Cl.
CPC .......... G06V 20/188 (2022.01); G06V 10/143 (2022.01); G06V 10/22 (2022.01); *G06V 20/194* (2022.01)

(58) Field of Classification Search
CPC .... G06V 20/188; G06V 10/143; G06V 10/22; G06V 20/194
See application file for complete search history.

(56) References Cited

U.S. PATENT DOCUMENTS

2020/0193589 A1\* 6/2020 Peshlov .................. G06N 3/08

OTHER PUBLICATIONS

Xu, Yang, et al. "Anomaly detection in hyperspectral images based on low-rank and sparse representation." IEEE Transactions on Geoscience and Remote Sensing 54.4 (2015): 1990-2000. (Year: 2015).\*

Zhang, Yuxiang, et al. "A low-rank and sparse matrix decomposition-based Mahalanobis distance method for hyperspectral anomaly detection." IEEE Transactions on Geoscience and Remote Sensing 54.3 (2015): 1376-1389. (Year: 2015).\*

Kolda et al., "Tensor Decompositions and Applications", SIAM Review, Aug. 2009 pp. 455-500; vol. 51, No. 3.

\* cited by examiner

*Primary Examiner* — Fayyaz Alam
(74) *Attorney, Agent, or Firm* — Joseph Kolodka

(57) ABSTRACT

Systems and methods for anomaly detection are provided. The method includes structuring a multi-channel spatial-temporal sequence as a four-dimensional array. The method also includes decomposing the four-dimensional array to form a low-rank component representing a background signal and a residual component representing anomalies for each time point of the multi-channel spatial-temporal sequence. The method further includes determining a sequence of anomaly maps by stacking the residual components at all time points together. Anomalies are identified based on the sequence of anomaly maps.

19 Claims, 8 Drawing Sheets

BACKGROUND SUPPRESSION FOR ANOMALY DETECTION

RELATED APPLICATION INFORMATION

This application claims priority to U.S. Provisional Patent Application No. 62/807,002, filed on Feb. 18, 2019, incorporated herein by reference in its entirety.

BACKGROUND

Technical Field

The present invention relates to anomaly detection and more particularly anomaly detection in multi-channel spatial-temporal data.

Description of the Related Art

A multi-channel spatial-temporal sequence is data with more than one channels recorded for each spatial location over time. Multi-channel spatial-temporal data, such as the hyperspectral images recorded by a scanner, at each time point forms a 3-dimensional data array. The three dimensions are the two spatial dimensions and a channel dimension (the spectral bands in the context of hyperspectral imaging). Many real-world applications that process such data are known to use the identification of anomaly from normal signal.

SUMMARY

According to an aspect of the present invention, a method is provided for anomaly detection. The method includes structuring a multi-channel spatial-temporal sequence as a four-dimensional array. The method also includes decomposing the four-dimensional array to form a low-rank component representing a background signal and a residual component representing anomalies for each time point of the multi-channel spatial-temporal sequence. The method further includes determining a sequence of anomaly maps by stacking the residual components at all time points together. Anomalies are identified based on the sequence of anomaly maps According to another aspect of the present invention, a system is provided for anomaly detection. The system includes a processor device operatively coupled to a memory device. The processor device is configured to structure a multi-channel spatial-temporal sequence as a four-dimensional array. The processor device also decomposes the four-dimensional array to form a low-rank component representing a background signal and a residual component representing anomalies for each time point of the multi-channel spatial-temporal sequence. The processor device further determines a sequence of anomaly maps by stacking the residual components at all time points together. Anomalies are identified based on the sequence of anomaly maps These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
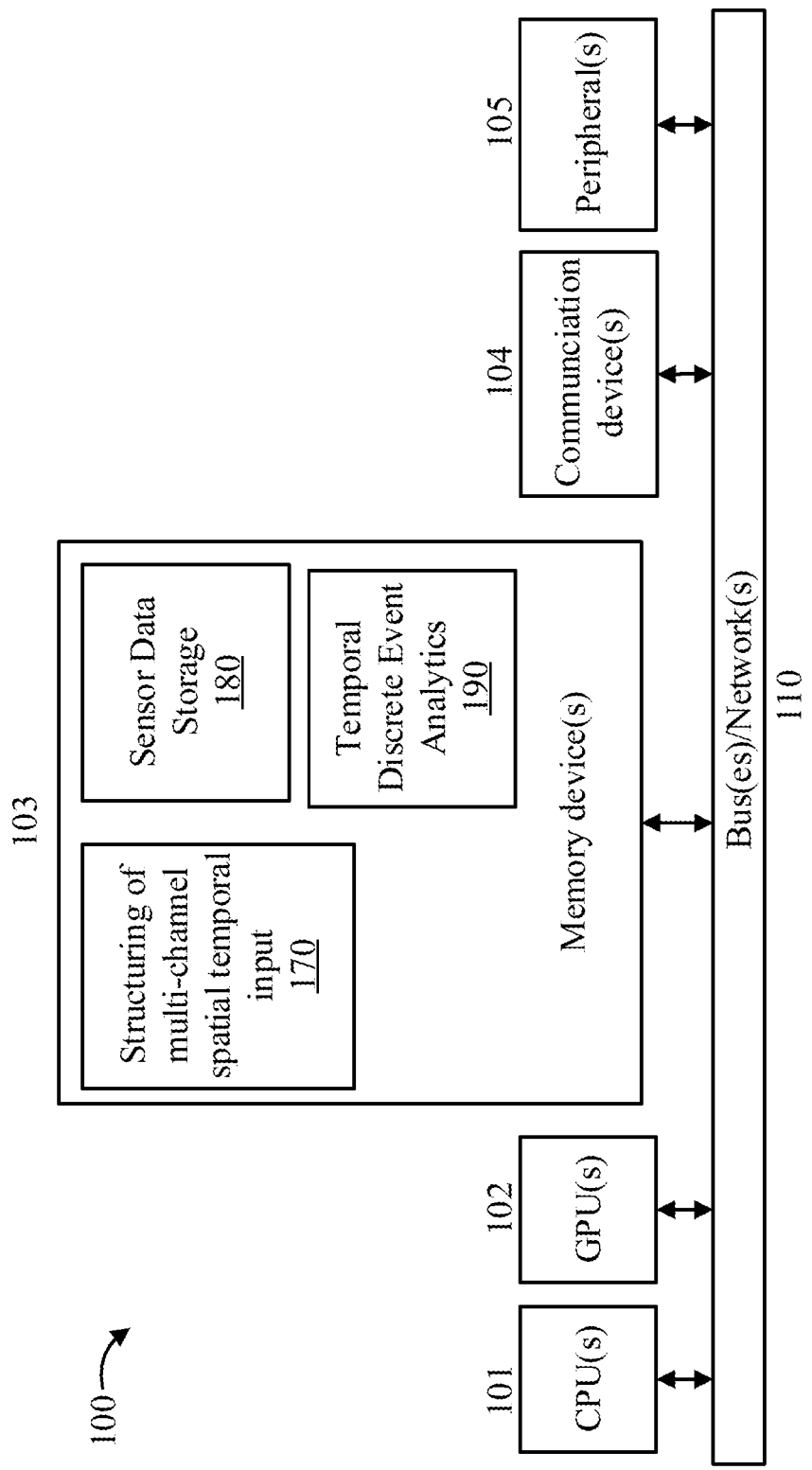
FIG. 1 is a block diagram showing an exemplary processing system, in accordance with an embodiment of the present invention.

In accordance with embodiments of the present invention, systems and methods are provided to/for anomaly detection in multi-channel spatial-temporal data. The system receives input signals in a four-dimensional (4-D) structure (distance, angle, frequency channel and time) and performs decomposition directly on this 4-dimensional array. Based on the assumption that the background signal usually has limited degree of variation, the system decomposes an input signal array X into two components: a low-rank component L and a residual component R.

In one embodiment, the system stacks estimated residual components at all time points together to obtain a sequence of anomaly maps, which are then output from the system. In embodiments, the system is applied to hyperspectral imaging, in which a two-dimensional (2-D) scene is scanned and each pixel recorded in a wide range of wavelength bands. The system can be incorporated into applications for agriculture and environment monitoring include detecting nutrition or water deficiency of crops and detecting hazards such as gas pipeline leakage.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 store program code for implementing one or more of the following: four-dimension (4-D) array structuring of multi-channel spatial temporal input 170, background separation 180, anomaly detection 190, etc. The 4-D array structuring of multi-channel spatial temporal input 170 includes Structuring the input multi-channel spatial-temporal sequence as 4-dimensional array. The background separation 180 decomposes a high-dimensional array into a low-rank component and a residual component. The anomaly detection 190 implements anomaly detection, for example, in hyperspectral imaging.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
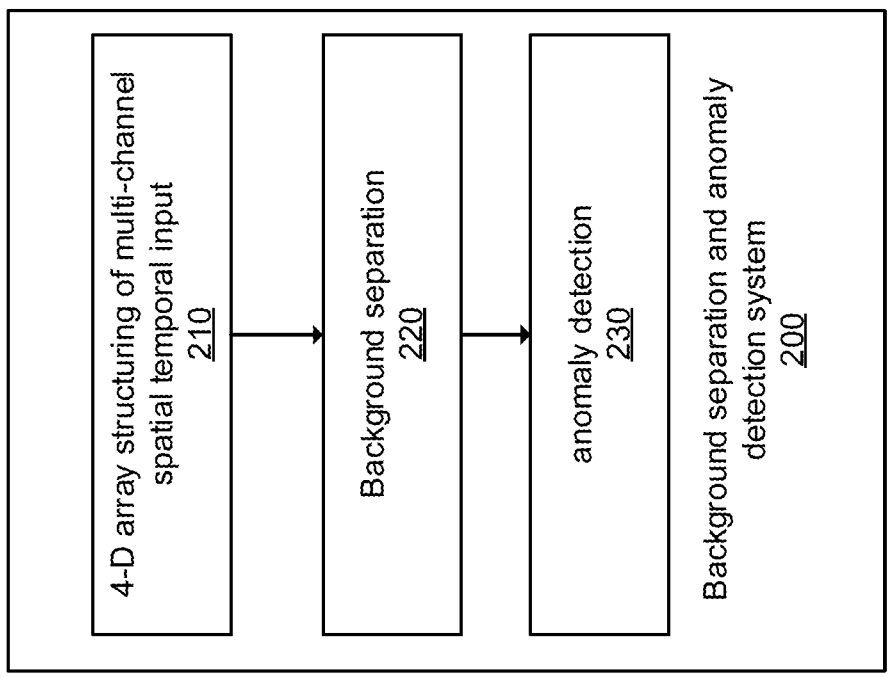
FIG. 2 is a schematic and block diagram illustrating a high-level system for background separation and anomaly detection in multi-channel spatial-temporal data, in accordance with an embodiment of the present invention.

Referring now to FIG. 2, a block diagram of a background separation and anomaly detection system 200 is illustratively depicted in accordance with an embodiment of the present invention.

As shown, background separation and anomaly detection system 200 implements 4-D array structuring of multi-channel spatial temporal input 210, background separation 220, and anomaly detection 230. The system 200 implements a data-driven process to learn the characteristics of the background signal and eliminate the background signal from the original signal.

Background separation and anomaly detection system 200 receives and inputs the signal in (for example, original) 4-dimensional structure (distance, angle, frequency channel and time) (in contrast to systems that reshape the input signal into a two-dimensional (2D) matrix (for example, as described herein below with respect to FIG. 3) and performs decomposition directly on this four-dimensional array. System 200 can operate on an assumption that the background signal usually has limited degree of variation. System 200, using background separation 220 as described herein below with respect to FIG. 4, decomposes an input signal array ("X") into two components: a low-rank component ("L") and a residual component ("R"). This can be formatted as X=L+R. In this instance, L represents the projection of the original signal onto the background subspace, and R represents the background-suppressed signal of the anomaly target.

The system 200 then performs anomaly detection 230 (for example, in hyperspectral imaging) based on the stacked together estimated residual components at (for example, all) time points, for example, as described herein below with respect to FIG. 5. The system 200 can be applied to hyperspectral imaging, which scans a 2-d scene and records each pixel in a wide range of wavelength bands. For example, the system 200 can detect anomalies in hyperspectral imaging from agriculture and environment monitoring include detecting nutrition or water deficiency of crops and detecting hazards such as gas pipeline leakage. The system 200 can detect these anomalies in instances in which background signals change with time due to daily or seasonal temperature variations and the inter-dependency between spatial locations and spectral bands.

Figure 3:
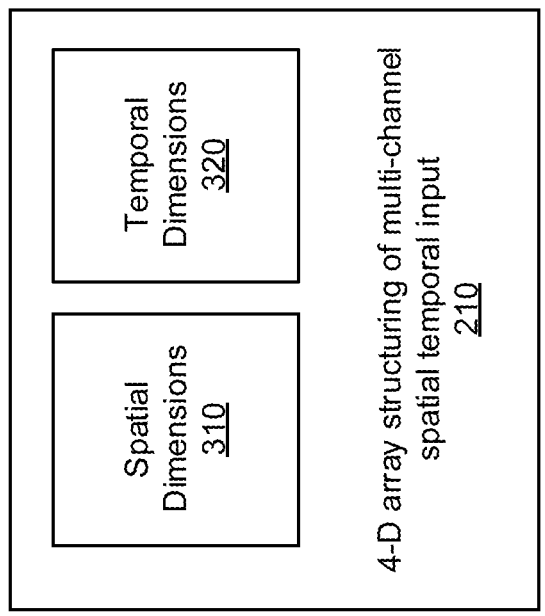
FIG. 3 is a block diagram illustrating a component for receiving input multi-channel spatial-temporal sequence structured as a 4-dimensional array, in accordance with an embodiment of the present invention.

Referring now to FIG. 3, a block diagram of a component for 4-D array structuring of multi-channel spatial temporal input 210 is illustratively depicted in accordance with an embodiment of the present invention.

As shown in FIG. 3, 4-D array structuring of multi-channel spatial temporal input 210 can receive input multi-channel spatial-temporal sequence structured as a four-dimensional array.

4-D array structuring of multi-channel spatial temporal input 210 can process multi-channel spatial-temporal data, such as the hyperspectral images recorded by a scanner, at each time point forms a 3-dimensional data array. The three dimensions are the two spatial dimensions 310 and a channel dimension 320 (the spectral bands in the context of hyperspectral imaging).

4-D array structuring of multi-channel spatial temporal input 210 can receive hyperspectral imaging, which scans a 2-D scene and records each pixel in a wide range of wavelength bands.

Figure 4:
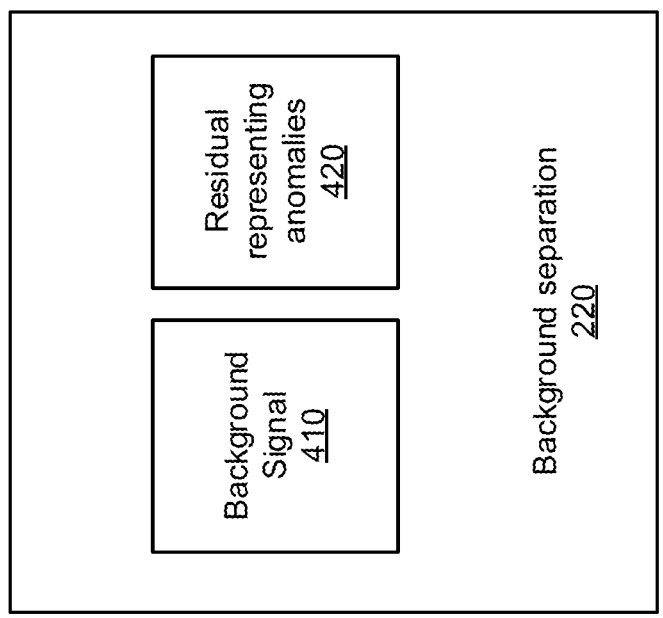
FIG. 4 is a block diagram illustrating a component for decomposing multi-channel spatial-temporal sequence, in accordance with an embodiment of the present invention.

Referring now to FIG. 4, a block diagram of a component for background separation 220 is illustratively depicted in accordance with an embodiment of the present invention.

Background separation 220 takes the 3-dimensional array for every time point of the input sequence and generates a low-rank component representing the background signal 410 and a residual component representing anomalies 420. Background separation 220 can operate on an assumption that the background signal 410 (for example, usually) has limited degree of variation. Background separation 220 can implement a process as follows:

function DECOMPOSE(X)
    assign positive integer values to $r_1, \ldots, r_d$ that represent the estimated degrees of background variation for each dimension.
    for i=1 . . . d do
        $U^{(i)} \leftarrow r_i$ leading left singular vectors of $X_{(i)}$
    end for
    $S \leftarrow X \, x_1 U^{(1)} x_2 \ldots x_d U^{(d)}$
    $L \leftarrow S \, x_1 U^{(1)T} x_2 \ldots x_d U^{(d)T}$
    R = X − L
    return L, R X is the 4-dimensional array representing the input hyperspectral data. In this process, $X_{(i)}$ denotes the mode-i unfolding of array X and is defined as a reshaping of X to a 2-dimensional matrix by fixing only the i-th dimension and flattening the remaining dimensions. U is a matrix of the basis. The columns of U are the left singular vectors of $X_{(i)}$. S is a matrix, referred to as the "core" matrix, that represents the coefficients of the input data expressed in terms of the basis. L is a reconstruction of the input data and represents the background. R is the residual in the data after removing the reconstructed background. This forms the anomaly map. The mode-i unfolding of a multi-dimensional array X, denoted $X_{(i)}$, is a 2-dimensional matrix obtained by reshaping X according to the following mapping: if X is an array of shape $d_1 \times d_2 \times \ldots \times d_N$, then element $(u_1, u_2, \ldots u_N)$ of X maps to element $(u_i, v)$ of $X_{(i)}$, with $$v = \sum_{k=1, k \neq i}^{N} \left[ u_k \times \prod_{m=1, m \neq i}^{k-1} d_m \right]$$

The operator $x_i$ denotes the i-mode product, which multiplies each flattened "fiber" of an n-way array with a 2-d matrix. Background separation 220 turns an n-way array into another n-way array whose shape is identical to the original except for the i-th dimension.

The input to this process is a multi-channel spatial-temporal sequence X. Denote by d the number of dimensions of X. In the case of hyperspectral imaging with 2-dimensional spatial scenes, d=4.

According to an example embodiment, background separation 220 initially receives a set of positive integers (for example, provided by a user or device) that represents the estimated degree of variations of the background signal for each dimension. The device (or a user) can determine these numbers empirically.

The leading singular vectors of the unfolded version of the input array are then found (for example, identified) for each dimension. Background separation 220 can thereby obtain a (for example, small, sufficient, etc.) set of basis that adequately characterizes the variation of the input signal in each dimension. The set of basis can describe vectors in the vector space of the array for each of the dimensions (for example, spatial and temporal dimensions).

Background separation 220 can project the input signal onto the set of basis for all dimensions. By performing this operation, background separation 220 condenses the original signal into a coefficient representation ("S") with respect to the estimated set of basis.

Background separation 220 then performs a reconstruction of the input signal from the projection. The reconstructed array ("L") only contains information on the selected set of basis and as a result is low-rank. This represents the background signal 410. Background separation 220 then obtains the residual 420 by subtracting the background from the raw signal.

Figure 5:
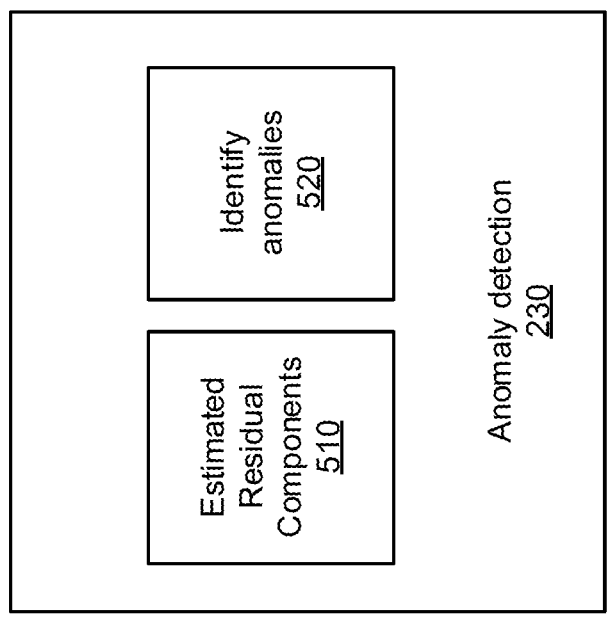
FIG. 5 is a block diagram illustrating a component for compiling a sequence of anomaly maps, in accordance with an embodiment of the present invention.

Referring now to FIG. 5, a block diagram of a component for anomaly detection 230 is illustratively depicted in accordance with an embodiment of the present invention.

The estimated residual components at all time points 510 are stacked together to obtain a sequence of anomaly maps, which are the output of this system. Anomaly detection 230 can be applied to hyperspectral imaging. For example, hyperspectral imaging applications in agriculture and environment monitoring include detecting nutrition or water deficiency of crops and detecting hazards such as gas pipeline leakage. The system 200 detects these anomalies despite (for example, by determining and thereby adjusting for) background signals that often change with time due to daily or seasonal temperature variations and the inter-dependency between spatial locations and spectral bands. System 200 accounts for the dependencies between different spatial locations and different channels and characterizes the background robustly.

The example embodiments described herein above treat the input signal X as a multi-dimensional array and as a result can model the dependency between the dimensions in the background signal, allowing the background to be characterized more accurately and making anomaly detection more robust.

According to an alternate embodiment that does not model the dependency, the system treats the input signal X as a 2-dimensional matrix where the rows correspond to different timesteps and columns correspond to different spatial locations and spectral bands. In this instance, the implication is that the columns, or the different spatial locations and spectral bands, are independent from each other. However, in real situations, there are often hidden factors that correlate the spatial dimension and the spectral dimension. For example, a certain type of vegetation tends to grow at a particular area and also possess a particular spectral signature.

In an example embodiment, the system 200 identifies anomalies 520 (for example, that indicate nutrition or water deficiency of crops and detecting hazards such as gas pipeline leakage, etc.) based on the sequence of anomaly maps. System 200 can initiate actions based on the anomalies. According to an example embodiment, the system 200 can convert the real-valued anomaly maps to a binary map by thresholding, for example, elements less than a threshold value are set to zero. This binary map can be rendered on a digital screen and presented to end users. From the binary map end users can locate the anomaly and take actions. For example, in crop water demand monitoring, if a certain area shows high values on the map, this suggests the crops at that area suffer from an abnormal water level. End users (farmers) can then adjust the irrigation to that area to correct the condition.

Figure 6:
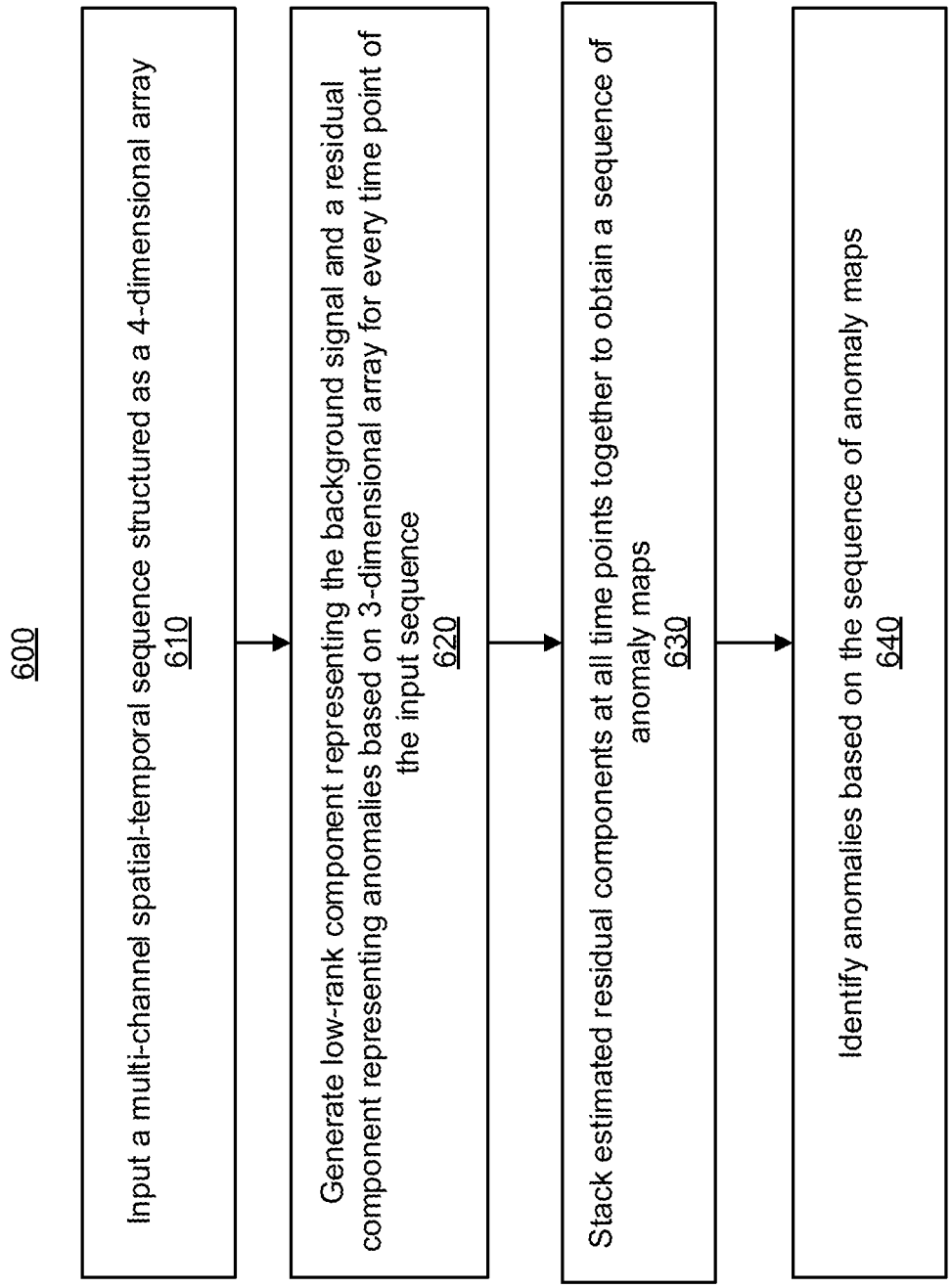
FIG. 6 is a flow diagram illustrating a method for anomaly detection in multi-channel spatial-temporal data, in accordance with an embodiment of the present invention.

Referring now to FIG. 6, a method 600 for anomaly detection in multi-channel spatial-temporal data is illustratively depicted in accordance with an embodiment of the present invention.

At block 610, system 200 receives as input a multi-channel spatial-temporal sequence structured as a 4-dimensional array (comprising a 3-dimensional array for multiple time points of the input sequence).

At block 620, system 200 implements a process (for example, as described with respect to FIG. 7 herein below) that takes the 3-dimensional array for every time point of the input sequence and generates a low-rank component representing the background signal and a residual component representing anomalies. For example, the process can be implemented for hyperspectral imaging, in which a two-dimensional (2-D) scene is scanned and each pixel recorded in a wide range of wavelength bands.

At block 630, system 200 stacks the estimated residual components at all time points together to obtain a sequence of anomaly maps, which are the output of this system.

At block 640, system 200 identifies anomalies based on the sequence of anomaly maps. System 200 can format and provide information regarding the anomalies on a graphical use interface of an associated device. The system presents the anomaly maps (real-valued or binary) to end users. Alternatively, or additionally, system 200 can initiate actions based on the detected anomalies.

Figure 7:
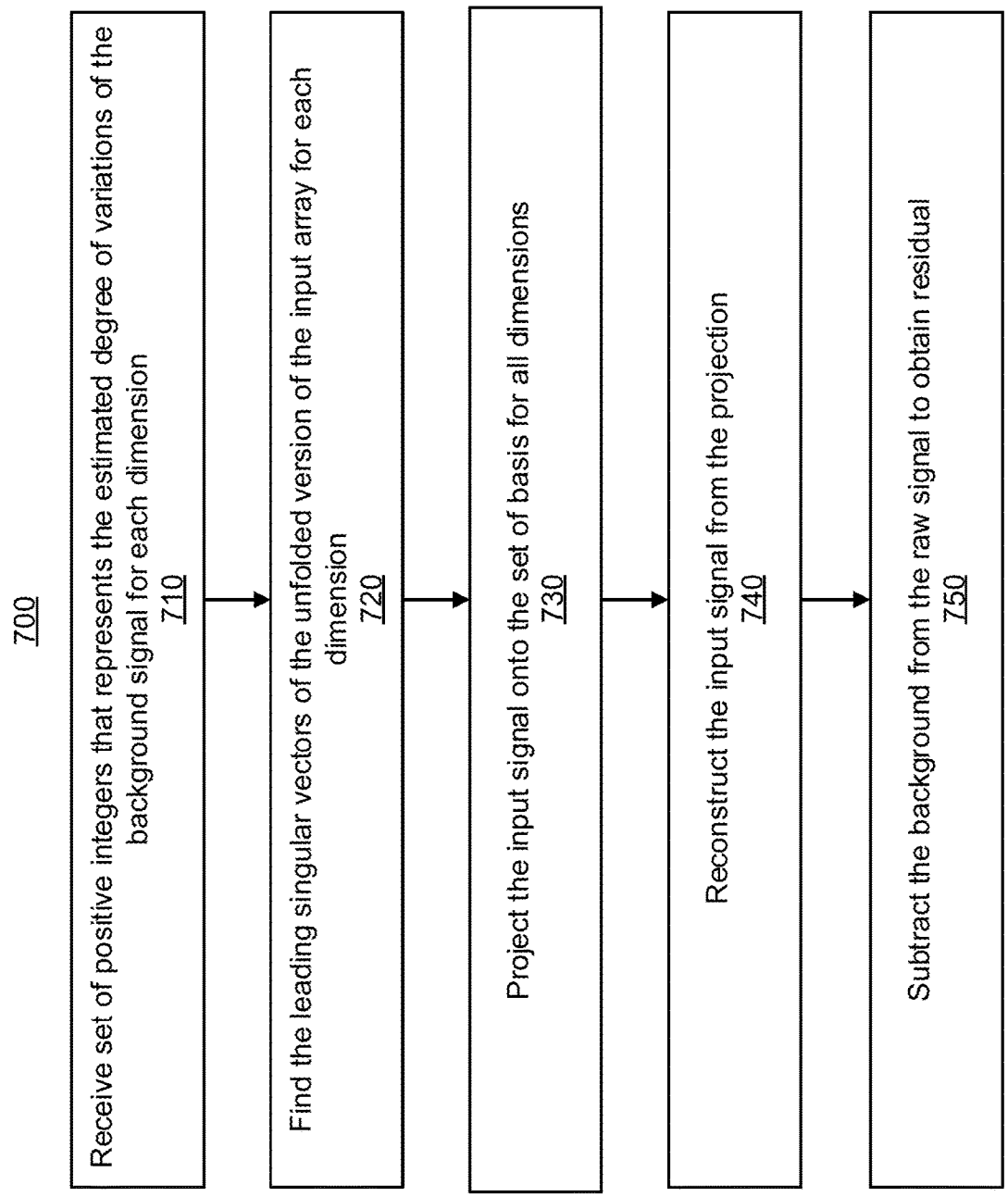
FIG. 7 is a flow diagram illustrating a method for generating a low-rank component and a residual component, in accordance with an embodiment of the present invention.

Referring now to FIG. 7, a method 700 for generating a low-rank component and a residual component is illustratively depicted in accordance with an embodiment of the present invention.

At block 710, system 200 receives a set of positive integers that represents the estimated degree of variations of the background signal for each dimension.

At block 720, system 200 finds the leading singular vectors of the unfolded version of the input array for each dimension.

At block 730, system 200 projects the input signal onto the set of basis for all dimensions. This operation condenses the original signal into a coefficient representation S with respect to the estimated set of basis.

At block 740, system 200 implements reconstruction of the input signal from the projection. The reconstructed array L only contains information on the selected set of basis and as a result is low-rank. This represents the background signal.

At block 750, system 200 obtains the residual by subtracting the background from the raw signal.

Figure 8:
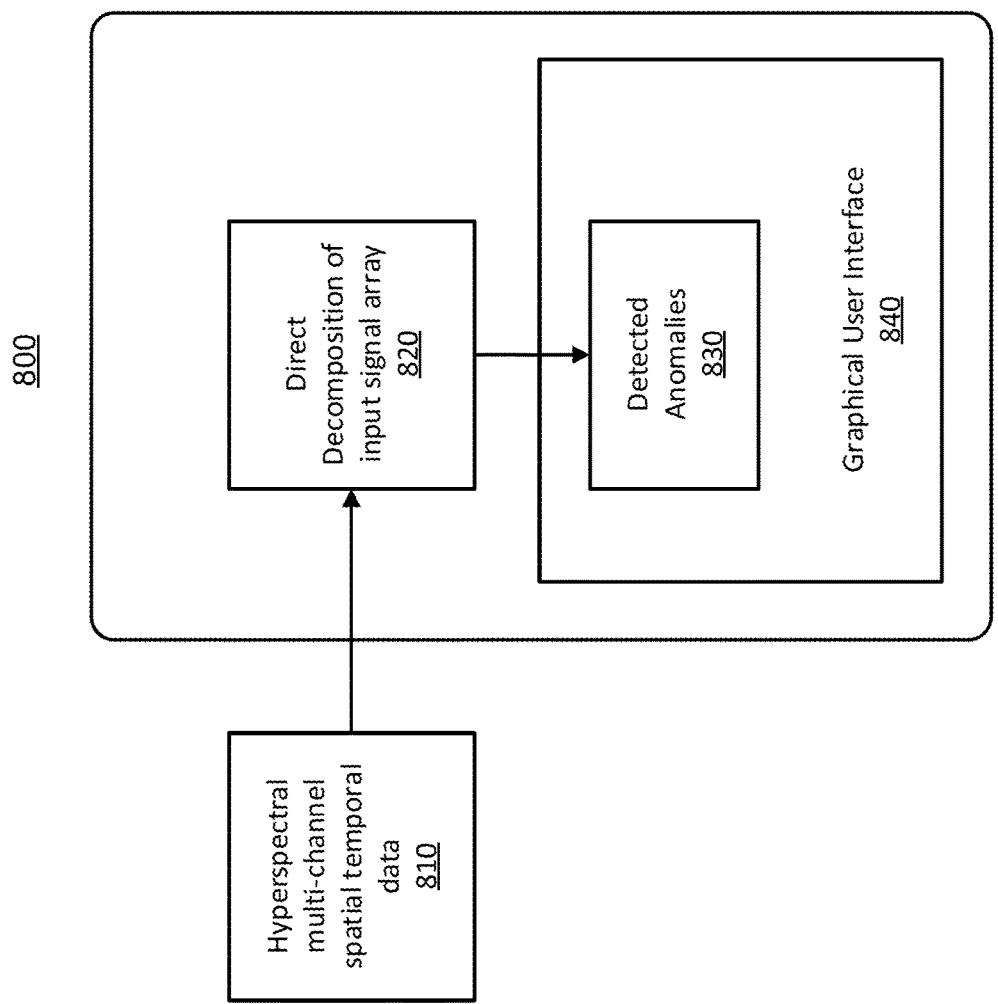
FIG. 8 is a block diagram illustrating a device for detecting anomalies in hyperspectral multi-channel spatial temporal data, in accordance with an embodiment of the present invention.

Referring now to FIG. 8, a block diagram of a device for detecting anomalies in hyperspectral multi-channel spatial temporal data is illustratively depicted in accordance with an embodiment of the present invention.

As shown in FIG. 8, device 800 receives hyperspectral multi-channel spatial temporal data. Multi-channel spatial-temporal data, such as the hyperspectral images recorded by a scanner, at each time point forms a 3-dimensional data array. The three dimensions are the two spatial dimensions and a channel dimension (the spectral bands in the context of hyperspectral imaging).

System 800 performs decomposition directly on this 4-dimensional array with its original 4-dimensional structure (distance, angle, frequency channel and time). Based on a postulate that the background signal usually has limited degree of variation, the system 800 decomposes an input signal array X into two components: a low-rank component L and a residual component R. In this instance L represents the projection of the original signal onto the background subspace, and R represents the background-suppressed signal of the anomaly target.

System 800 can present the detected anomalies 830, based on the residual, on a graphical user interface 840 (for example, of the device 800 or an associated device). The anomalies, regardless of application, can be presented as binary maps where the anomalies are shown in white pixels and the rest of the scene are shown as black (or otherwise differentiated).

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for anomaly detection, comprising:
   structuring a multi-channel spatial-temporal sequence as a four-dimensional array;
   decomposing the four-dimensional array to form a low-rank component representing a background signal and a residual component representing anomalies for each time point of the multi-channel spatial-temporal sequence;
   determining a sequence of anomaly maps by stacking the residual components at all time points together; and
   identifying anomalies based on the sequence of anomaly maps.

2. The method as recited in claim 1, wherein identifying the anomalies based on the sequence of anomaly maps further comprises:
   identifying the anomalies in a hyperspectral imaging sequence.

3. The method as recited in claim 1, further comprising:
   implementing flattening to account for dependencies between different spatial locations and different channels.

4. The method as recited in claim 1, wherein decomposing the four-dimensional array further comprises:
   decomposing an input signal array X into two components: a low-rank component L and a residual component R, wherein X=L+R, and wherein L represents a projection of an original signal onto a background subspace, and R represents a background-suppressed signal of an anomaly target.

5. The method as recited in claim 1, wherein decomposing the four-dimensional array further comprises:
   assigning positive integer values that represent an estimated degree of variation of the background signal for each dimension.

6. The method as recited in claim 1, wherein decomposing the four-dimensional array further comprises:
   determining a set of basis that characterizes a variation of an input signal in each dimension; and
   condensing an original signal into a coefficient representation with respect to the set of basis.

7. The method as recited in claim 6, further comprising:
   reconstructing an array including the input signal from a projection of an original signal onto a background subspace, wherein the reconstructed array is limited to information on the set of basis.

8. The method as recited in claim 1, wherein structuring the multi-channel spatial-temporal sequence further comprises:
   structuring a hyperspectral imaging sequence with two-dimensional spatial scenes.

9. The method as recited in claim 8, wherein structuring the multi-channel spatial-temporal sequence further comprises:
   implementing monitoring in agriculture and environment based on detecting at least one of nutrition, water deficiency of crops, and gas pipeline leakage.

10. The method as recited in claim 1, further comprising:
    determining at least one of daily or seasonal temperature variations and an inter-dependency between spatial locations and spectral bands.

11. The method as recited in claim 1, wherein the four-dimensional array includes dimensions of distance, angle, frequency channel and time.

12. A computer system for anomaly detection, comprising:
    a processor device operatively coupled to a memory device, the processor device being configured to:
    structure a multi-channel spatial-temporal sequence as a four-dimensional array;
    decompose the four-dimensional array to form a low-rank component representing a background signal and a residual component representing anomalies for each time point of the multi-channel spatial-temporal sequence;
    determine a sequence of anomaly maps by stacking the residual components at all time points together; and
    identify anomalies based on the sequence of anomaly maps.

13. The system as recited in claim 12, wherein, when identifying the anomalies based on the sequence of anomaly maps, the processor device is further configured to:
    identify the anomalies in a hyperspectral imaging sequence.

14. The system as recited in claim 12, wherein the processor device is further configured to:
    implement flattening to account for dependencies between different spatial locations and different channels.

15. The system as recited in claim 12, wherein, when decomposing the four-dimensional array, the processor device is further configured to:
    decompose an input signal array X into two components: a low-rank component L and a residual component R, wherein X=L+R, and wherein L represents a projection of an original signal onto a background subspace, and R represents a background-suppressed signal of an anomaly target.

16. The system as recited in claim 12, wherein, when decomposing the four-dimensional array, the processor device is further configured to:

assign positive integer values that represent an estimated degree of variation of the background signal for each dimension.

17. The system as recited in claim 12, wherein, when decomposing the four-dimensional array, the processor device is further configured to:

determine a set of basis that characterizes a variation of an input signal in each dimension; and condense an original signal into a coefficient representation with respect to the set of basis.

18. The system as recited in claim 17, wherein the processor device is further configured to:

reconstruct an array including the input signal from a projection of an original signal onto a background subspace, wherein the reconstructed array is limited to information on the set of basis.

19. The system as recited in claim 11, wherein, when applying the NMT model to quantify strength of invariant relationship, the processor device is further configured to:

determining at least one of daily or seasonal temperature variations and an inter-dependency between spatial locations and spectral bands.

* * * * *